T. G. BIRD.
TIDAL POWER DEVICE.
APPLICATION FILED MAR. 30, 1910.

999,198.

Patented Aug. 1, 1911.
4 SHEETS—SHEET 3.

Witnesses.
F. J. Glover
P. H. Baughman

Inventor
Thomas G. Bird
By R. C. Wright
Attorney.

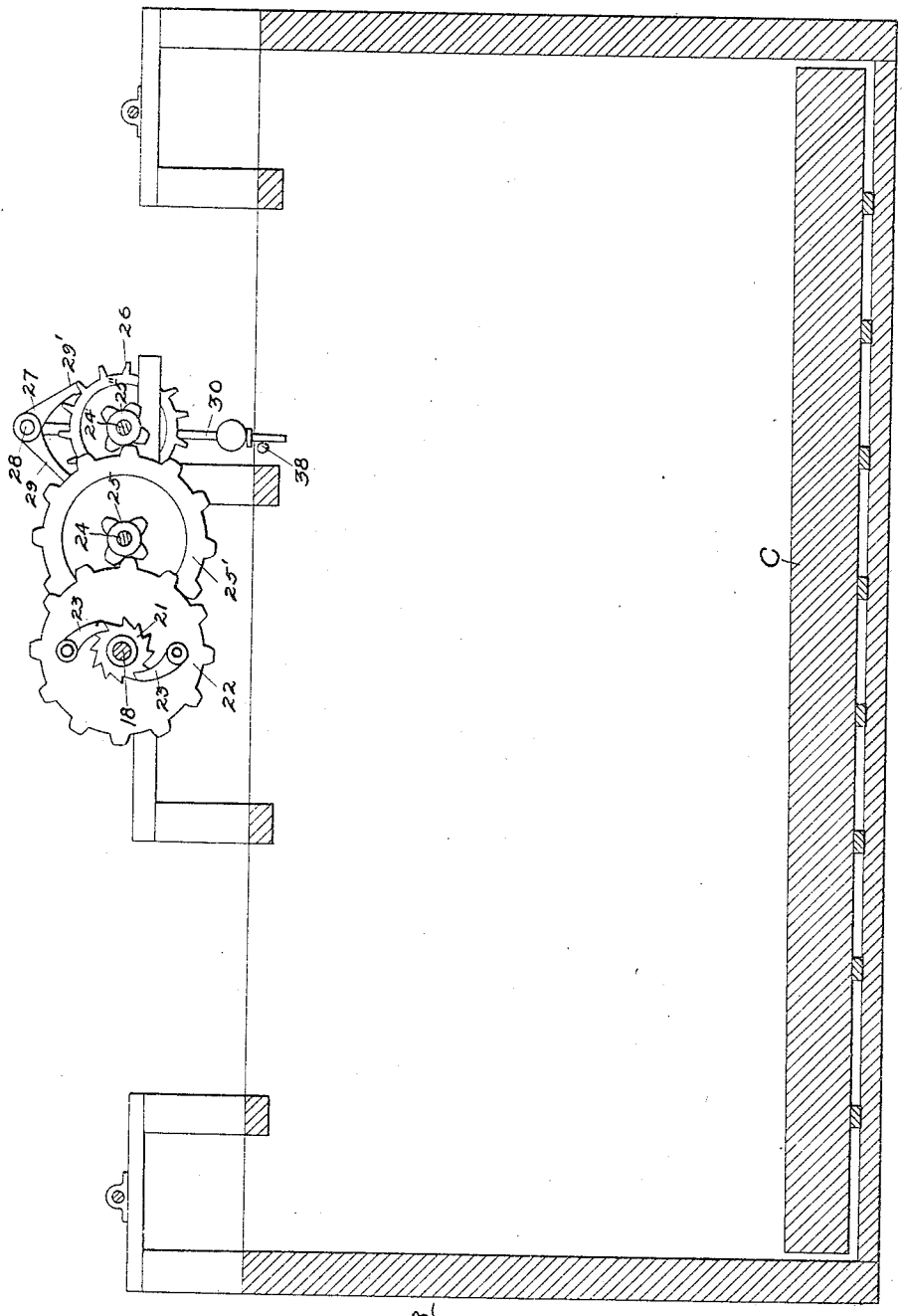

UNITED STATES PATENT OFFICE.

THOMAS G. BIRD, OF EUGENE, OREGON, ASSIGNOR OF TWO-FIFTHS TO MARCELLUS P. BONNETT, OF EUGENE, OREGON.

TIDAL-POWER DEVICE.

999,198.      Specification of Letters Patent.      Patented Aug. 1, 1911.

Application filed March 30, 1910. Serial No. 552,466.

*To all whom it may concern:*

Be it known that I, THOMAS G. BIRD, a citizen of the United States, residing at Eugene, in the county of Lane and State of Oregon, have invented a new and useful Improvement in Tidal-Power Devices, of which the following is a specification, reference being had to the accompanying drawings.

My invention relates a class of devices for utilizing the power developed by the ebb and flow of ocean tides.

The object of my invention is to provide a device wherein a float is caused to rise by the tides and the power derived from its gravity movement is transmitted through suitable and convenient mechanism for use wherever desired. I attain these objects as well as other advantages, by the construction, combination and arrangement of parts illustrated in the accompanying drawings which form a part hereof.

Figure 1:
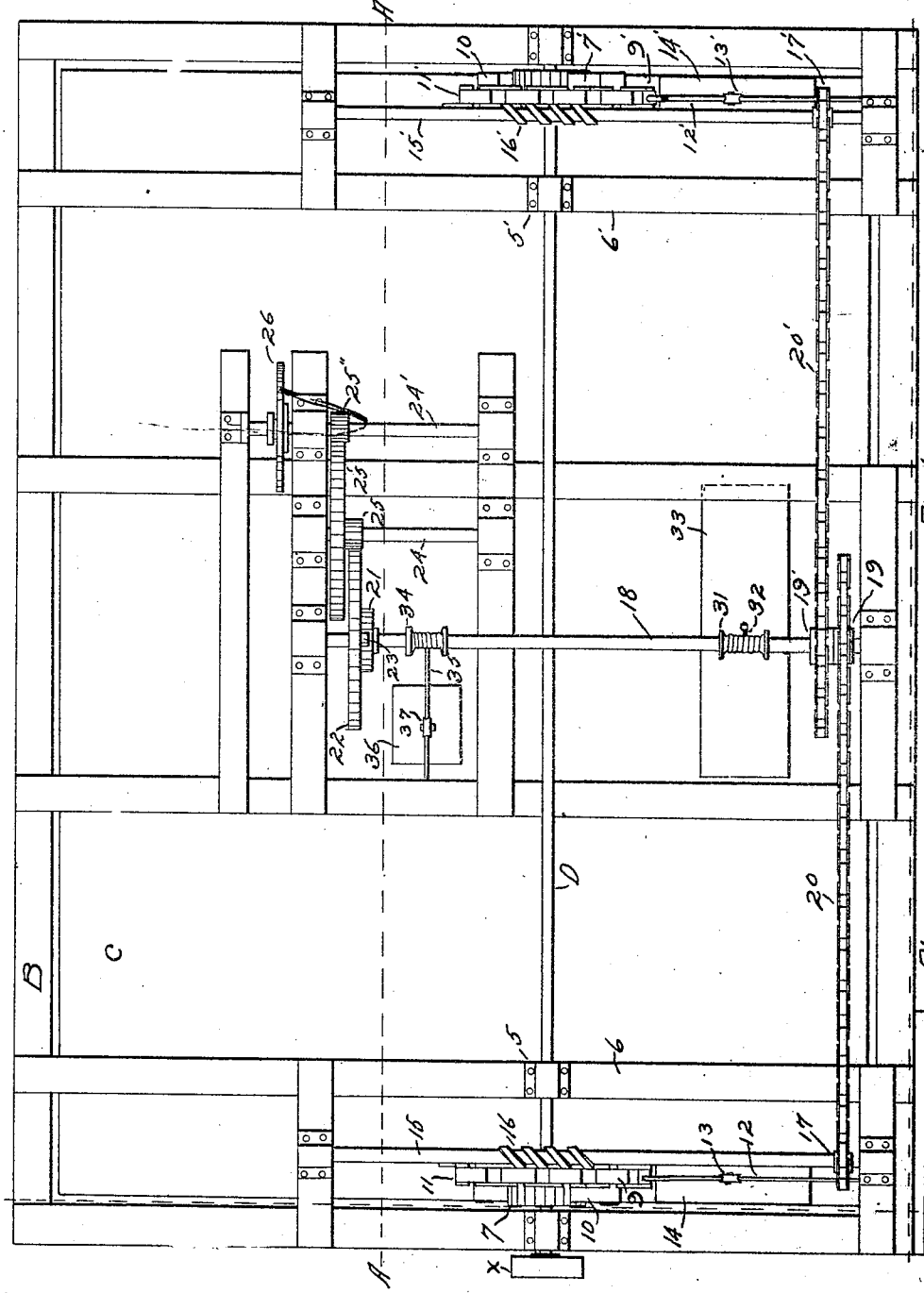
Figure 2:
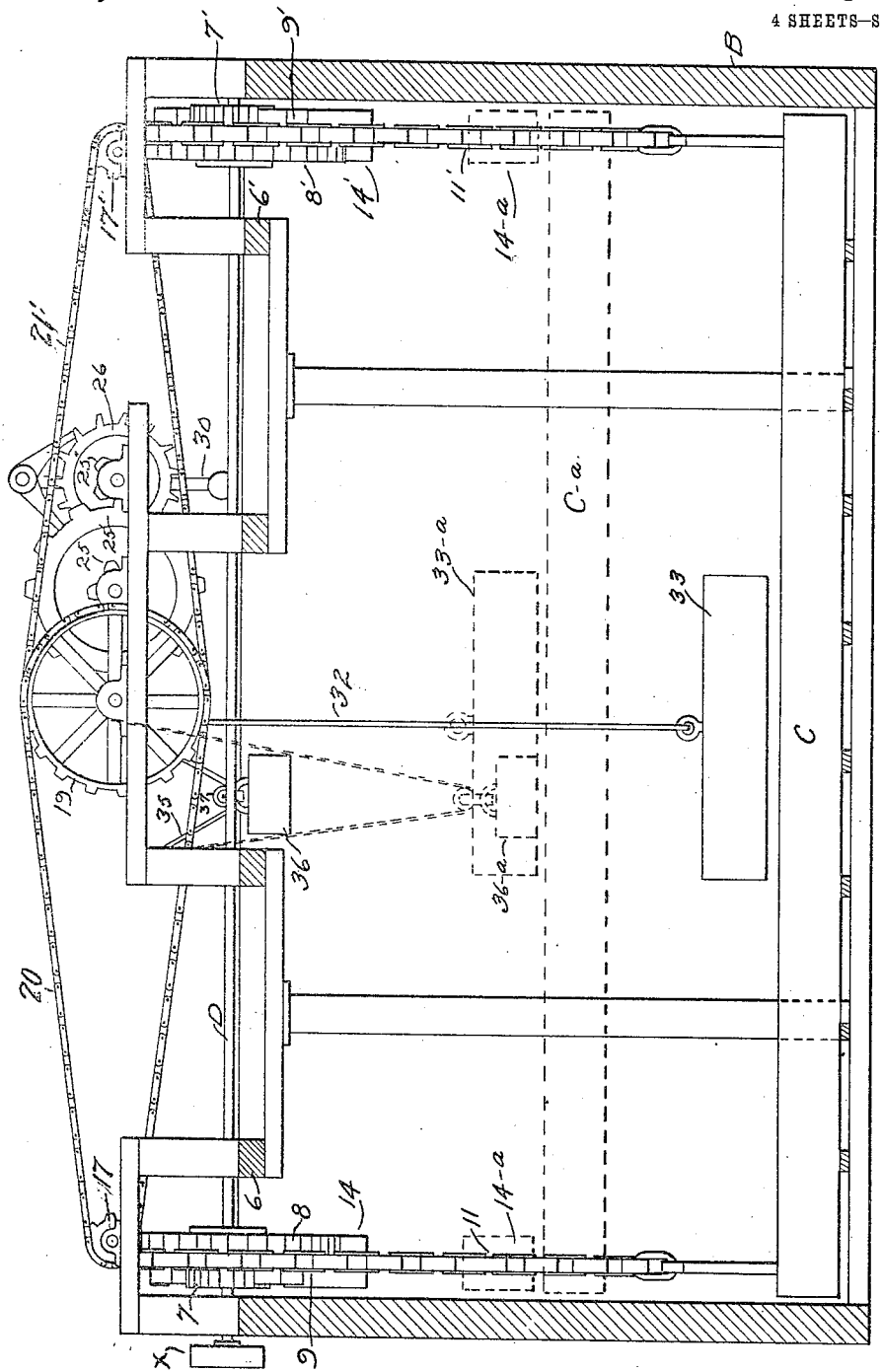
Figure 3:
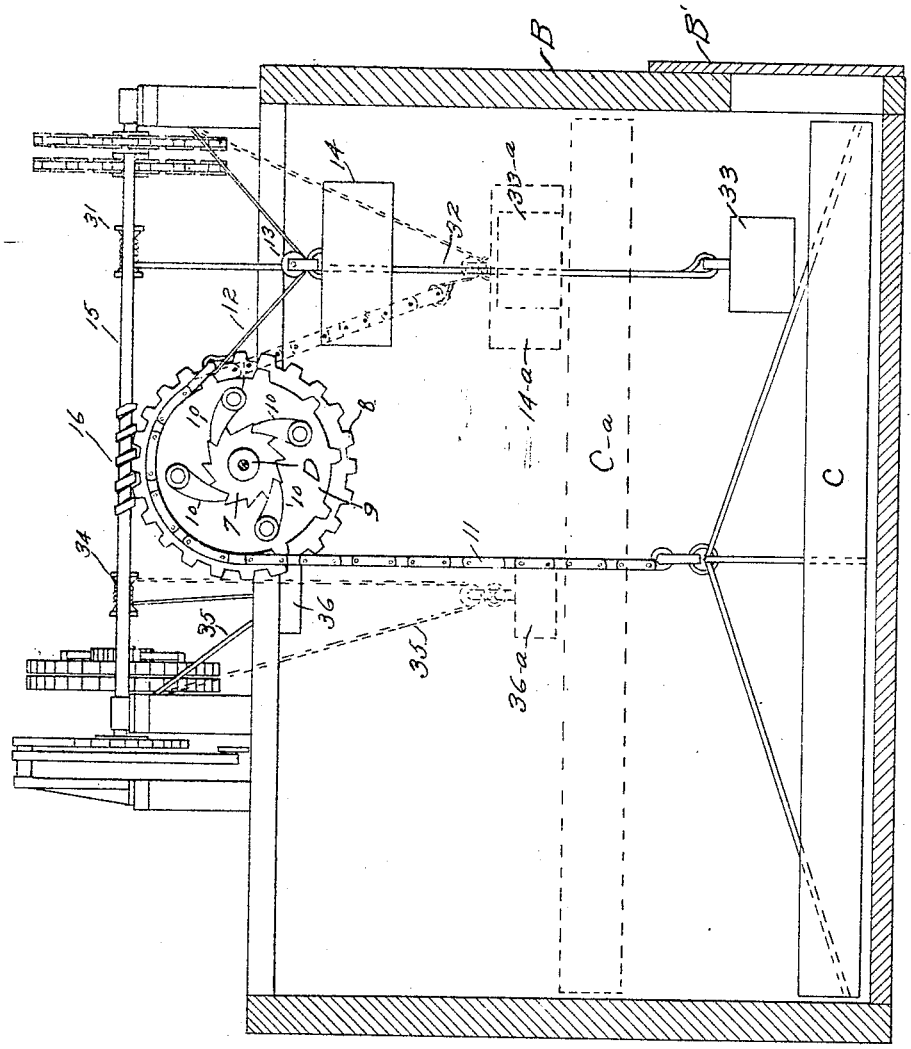

Figure 1 is a plan view of my device. Fig. 2 is a sectional side elevation of the same. Fig. 3 is a sectional rear elevation of the device. Fig. 4 is a sectional view on the line A—A of Fig. 1, showing detail of the governor mechanism only.

Like numerals and letters refer to like parts throughout the views.

B is a vessel or compartment placed in a suitable position where tidal water may flow in and out of it.

C is a float within the compartment and movable vertically therein.

D is a main shaft extending longitudinally of the compartment B with bearings 5—5' on transverse beams 6—6' near the top thereof. On the ends of the shaft D ratchet pinions 7—7' are rigidly secured. Worm wheels 8—8' and sprocket wheels 9—9' are united as one member and this member is rotatably mounted on the shaft D as a unit. Between these pinions and worm wheels are placed sprocket wheels 9—9', rotatable on the shaft D. Pawls 10 are pivoted upon the faces of the sprockets 9—9' in position to engage the ratchet pinions 7—7'. Sprocket chains 11—11' are secured by one end to the float C near each end thereof and extended over the sprockets 9—9' a suitable distance. To the opposite ends of the chains 11—11' are secured cords 12—12' which pass under pulleys 13—13' which are secured to weights 14—14' and extend to the wall of the compartment or frame thereon to which the opposite ends of the cords are secured. At each end of the compartment B, transverse shafts 15—15' are placed immediately above the worm wheels 8—8'. On the central parts of the shafts 15—15' are worms 16—16' which engage the worm wheels 8—8'. These shafts rotate in bearings of a frame placed on the upper part of the compartment B. Near one end of the shafts 15—15', sprockets 17—17' are rigidly secured. A governor shaft 18, rotatable in bearings of a frame on the upper part of the compartment B, is placed transversely and near the center of the compartment. Near one end of the shaft 18 two sprockets 19—19' are rigidly secured to it. From and about these sprockets, link chains 20—20' extend about the sprockets 17—17' of the shafts 15—15' respectively.

Near the opposite end of the shaft 18 a ratchet pinion 21 is rigidly secured thereon. Beyond this ratchet pinion, a ratchet wheel 22 is rotatably mounted on the shaft 18. Upon one face of the wheel 22 pawls 23 are pivoted in position to engage the ratchet pinion 21. Parallel with the shaft 18 and near it, two shorter shafts 24—24' are rotatably mounted in bearings in the frames on the upper part of the compartment B. Near the ends of these shafts are rigidly mounted toothed wheels 25—25'—25" which form a train of gearing connecting the shafts 18 and 24'. Near one end of the shaft 24' is a recoil or anchor escapement mechanism, comprising the toothed wheel 26, rigidly secured on the shaft 24', an anchor 27 rigidly secured above the wheel 26 on a pivot 28, and provided with pallets 29—29' placed to engage the teeth of the wheel 26. A pendulum 30 is rigidly secured at its upper end to the pivot 28 alongside the anchor. Near the sprocket 19', a spool 31 is rigidly secured on the shaft 18. A cord 32 is secured to and coiled around this spool and a weight 33 is secured to the lower end of the cord. Near the ratchet pinion 21 a second spool 34 is rigidly secured on the shaft 18. A cord 35 is coiled around and secured at one end to the spool 34 and at the opposite end to a suitable part of the upper frame. A weight 36, suitably lighter than the weight 33, is suspended on the cord 35 by means of a pulley 37. Upon one extreme end of the shaft D a pulley $x$ is rigidly secured. A belt may be passed over this pulley as a means for transmitting power to any desired place. A locking key 38 see Fig. 4 is provided to lock the escapement mechanism when it is desired to shut off the transmission of power.

The compartment B is provided with a gate B' for the purpose of admitting the tide to raise the float and to prevent its inflow while the float is descending and transmitting power. This gate may be raised or lowered by screws or any suitable mechanism which it may be desired or is convenient to provide for the purpose but no claims being made for the manner of moving the gates no particular method is shown.

It will now be seen that the float is shown at the bottom of the compartment, the weights 14—14' and 33—33' having descended also, while the weight 36 is at its height. The gate B' is then opened and the rising tide allowed to flow into the compartment B. This raises the float C which in turn carries upward the weights 33—33' until these are respectively in the dotted line positions shown at $C^a$, and $33^a$ while the weight 36 descends to the dotted line position $36^a$ and the weights 14—14' to the dotted line positions $14^a$. During this operation the weights 14—14' take up the slack of the chains 11—11' drawing the pawls backward over the ratchet pinions 7—7' and the light weight 36 causes the governor shaft 18 to rotate backward, drawing the pawls 23 over the ratchet pinion 21. When the tide has elevated the float C to its extreme height the mechanism is prevented from operating by the key 38 inserted in the path of the pendulum, and the float held suspended at its height until the tide is again at ebb when the gate B' is closed to shut out the water. The mechanism then being released by removal of the key 38, the float descends by gravity and by means of the intervening mechanism rotates the shaft D and the power thus created is transmitted by means of the pulley $x$ to any desired place. The rotary speed of the shaft D, the gravity action of the float C and the rotation of the pulley $x$ are governed by the escapement mechanism, through its train of gearing to the shaft 18 and from thence by other intervening mechanism to an engagement with the worm wheels 8—8' mounted on the shaft D. The speed is regulated by the adjustment of the pendulum 30 to swing at a desired movement. During the descent of the float the weights 14—14' ascend and 33—33' descend, while the light weight 36 ascends to its mean height.

It will be seen that my device is arranged so that it may be operated by tides of any height, and by means of the float weights and their suspension, energy may be stored for use at such times as power is desired. I contemplate the use of a series of my devices and contend that three of them in operation as I propose will permit the continuous transmission of power. Also the operation of several together with maximum practical float weights will supply a very large amount of power. This power may be first transmitted to dynamos for example, and from them electrical energy transmitted very conveniently to any desirable place.

Having thus described my invention I claim:

1. A tidal power device comprising a compartment, a float of suitable weight movable vertically therein suspended from sprocket wheels rotatably mounted on a main shaft, a rotatable main shaft having near its ends ratchet pinions rigidly secured thereon and sprocket wheels rotatable on the shaft, provided with pawls on one face in position to engage the pinion ratchets when the float descends, link chains having one end secured to the float and passing over the sprocket wheels, also means to cause said chains to rotate the pawl sprockets reversely when the float ascends substantially as described.

2. A tidal power device comprising a compartment provided with water gates, a float of suitable weight movable vertically therein suspended from sprocket wheels rotatably mounted on a main shaft, a rotatable main shaft having near its ends ratchet pinions rigidly secured thereon and sprocket wheels rotatable on the shaft, provided with pawls on one face in position to engage the pinion ratchets when the float descends, link chains having one end secured to the float and passing over the sprocket wheels, also means to cause said chains to rotate the pawl sprockets reversely when the float ascends, substantially as described.

3. A tidal power device comprising a compartment, a float of suitable weight movable vertically therein suspended from sprocket wheels rotatably mounted on a main shaft, a rotatable main shaft having near its ends ratchet pinions rigidly secured thereon and sprocket wheels rotatable on the shaft provided with pawls on one face in position to engage the pinion ratchets when the float descends, link chains having one end secured to the float and passing over the sprocket wheels, means to secure said chains to rotate the pawl sprockets reversely when the float ascends, worm wheels rotatably mounted on the main shaft near its ends and means to lock, release, and govern the speed of their movement, consisting of a suitable escapement mechanism conveniently placed and other intervening mechanism leading therefrom to engagement with said worm wheels, substantially as described.

4. A tidal power device comprising a compartment provided with water gates, a float of suitable weight movable vertically therein suspended from sprocket wheels rotatably mounted on a main shaft, a rotatable main shaft having near its ends ratchet pinions rigidly secured thereon, sprocket wheels rotatable on the shaft, provided with pawls on one face in position to engage the pinion ratchets when the float descends, worm wheels near the pawl sprockets rotatably mounted on the shaft, means to lock, release, and govern the speed of their movement, consisting of a suitable escapement mechanism conveniently placed and other intervening mechanism leading therefrom to engagement with said worm wheels, link chains having one end secured to the float and passing over the pawl sprockets, means to cause said chains to rotate the pawl sprockets reversely when the float ascends, and a power transmitting pulley on the end of the main shaft, substantially as described.

THOMAS G. BIRD.

Witnesses:
C. A. WILLIAMS,
M. L. PRATT.